Aug. 29, 1950     G. A. SOWERBY ET AL     2,520,699
BELTING
Filed July 25, 1945                           2 Sheets-Sheet 1

INVENTORS
G. A. Sowerby +
W. S. Short
By Watson, Cole, Grindle
        + Watson

Aug. 29, 1950    G. A. SOWERBY ET AL    2,520,699
BELTING

Filed July 25, 1945    2 Sheets-Sheet 2

Inventors
George Angus Sowerby
and William Stanley Shore
By Watson, Cole, Grindle & Watson,
Attorneys.

UNITED STATES PATENT OFFICE 2,520,699

BELTING

George Angus Sowerby, Newcastle-on-Tyne, and William Stanley Short, Seaton Burn, Newcastle-on-Tyne, England, assignors to George Angus & Company Limited, Newcastle-on-Tyne, England Application July 25, 1945, Serial No. 607,025
In Great Britain August 16, 1944

3 Claims. (Cl. 74—231)

Belting is frequently manufactured from woven cloth and often has a coating of rubber calendered on to the driving face for the purpose of increasing the coefficient of friction. Multi-ply belting is commonly built up of superposed plies of woven fabric on to which rubber has been calendered, the rubber serving to effect adhesion between the several plies. It is known to stretch such multi-ply belting after the plies have been stuck together and to vulcanise the rubber under heat while the belting is so stretched, the rubber then serving the further purpose of preventing subsequent contraction of the belting.

The object of this invention is to enable belting to be manufactured from knitted textile fabric. The use of knitted fabric for this purpose is desirable not only because knitting constitutes one of the cheapest methods of converting yarn into a fabric, but also because, as hereinafter more fully explained, the ends of a strip of knitted fabric unlike those of a strip of woven or braided fabric can be joined to form a joint which is truly homogeneous with the remainder of the strip, which renders the use of knitted fabric of especial advantage for the manufacture of endless belting. Woven belting can, it is true, be made truly endless by a complicated process of weaving, using a warp constituted by a single continuous yarn. This procedure however is relatively inconvenient and moreover suffers from the disadvantage that the belt can only be woven to a definite determined length. Knitting belting can however be knitted in a continuous length and cut and joined to make a homogeneous belt of any desired length.

Knitted fabric, as such, however would be of little use for the manufacture of machine belting or even of conveyor belting, owing to its high degree of stretch. Thus knitted cotton fabric has an extension of the order of 50–150% at break, whereas the extension at break of a normal belting is of the order of 15%.

In our patent No. 2,439,586, issued April 13, 1948, on an application filed on even date herewith we have described a method of manufacturing belting from fabric knitted from rubberised yarn, which consists in stretching the fabric to a sufficient extent and subjecting the rubber to curing under heat and pressure while the fabric is maintained stretched. The knitted fabric, however, has often to be stretched to something of the order of double its length to ensure that there will be no substantial further extension of the belting in service, and it is not very convenient to have to do this on the press.

We have discovered, however, that if the fabric is impregnated, after knitting, with rubber, either natural or synthetic, in a wet condition, i. e. either as latex or as rubber solution, stretched to the required extent and maintained so stretched until the rubber has dried, the dried rubber is effective to prevent subsequent contraction of the fabric.

The present invention relates to a method of manufacturing friction surface belting, and to such belting as an article of manufacture, such method comprising the steps of impregnating a strip of knitted textile fabric with rubber by application thereto of rubber latex or rubber solution, stretching the fabric to a sufficient extent before, during or after impregnation and maintaining the fabric so stretched until the rubber has dried. The impregnated fabric will generally be subjected to curing under heat and pressure although, as later explained, this is not always essential. The object of the vulcanization under pressure is chiefly to improve the appearance of the belt. Only the product or article referred to will be claimed in the present application. This product may be produced by the novel method described herein and also, in its broad aspects, by the method described and claimed in our said Patent No. 2,439,586.

By the expression "sufficient extent" we mean that the stretching will be sufficient to prevent any substantial further extension of the belting in service, whether for transmission or conveyor purposes. This result will be achieved when the finished product has an extension at break of about 3–17%, as compared with the above-quoted figure for normal knitted fabric of 50–150%. It is necessary for the belting to have a small amount of extensibility to enable it to operate as a belt, and to ensure that the spacing of the pulleys on which it is to operate is not too critical, and the figure of 15% extension at break is that laid down in the British Standard Specification for rubberised canvas belting as the maximum permitted extension. For some purposes, however, a somewhat larger extension can be tolerated.

The fabric is maintained stretched until the rubber has dried as otherwise the rubber will dry and lock the yarns together so as to render it impossible (unless the alternative procedure indicated below is adopted) to impart to the fabric that stretch in manufacture which is necessary to eliminate any undue tendency to stretch when used as belting. Sometimes, however, it may be advisable to subject the fabric to further stretching during curing on the press. This will not present any difficulty or inconvenience as the fabric is no longer highly extensible.

When the knitted fabric is thoroughly wetted with latex or rubber solution as described (latex being preferred), and stretched and dried while being maintained under stretch, the result will be that the interconnected loops of which the strip of fabric is formed will be elongated and straightened to a considerable degree, and tied together at their intersections in what are in effect, because of the stretching, tight knots. The wet rubber will to some extent be squeezed out from the interiors of the loops as these straighten and, after the drying, it will be found that all or substantially all of the surfaces of the stitches forming the loops will be coated with rubber, and that the adjacent surfaces of crossing stitches within the knots are bonded together by rubber. The relatively small amount of rubber which has dried within the knots, by bonding the tightly tied stitches together, is apparently the means whereby the knots are prevented from untieing, after the stretching force is relieved. The result of this is that contraction of the fabric after release of the stretching force is prevented except for any slight contraction which may occur in the portions of the yarns between adjacent rows of knots, immediately upon the release of that force. Due to this action of the rubber, curing under heat and pressure is not essential, and indeed we may in suitable cases impregnate the fabric with vulcanised rubber and so omit the step of curing the belting, relying on the drying of the rubber alone to prevent subsequent contraction of the belt.

The drying of the rubber on the stretched fabric is most conveniently effected in an oven, but we may, in the case where latex is employed achieve an equivalent result by coagulating the latex on the fabric, e. g. by introducing the impregnated fabric into a bath of acid or alcohol, the resulting deposition of the rubber in and between the yarns being effective to prevent contraction of the fabric on release of the stretching force.

Belting according to the invention may be manufactured in single ply or in multi-ply form, being constituted in the latter case by superposed plies of knitted fabric, lamination being effected either before or after the impregnation and stretching treatment and the plies being united by curing the rubber under heat and pressure, with or without the interposition of adhesive between the plies.

The belting may be made endless by joining the ends of the strip. This will be done prior to the curing treatment when this is practised. The joining may be done by hand knitting, as described in U. S. Patent No. 2,106,119, dated January 18, 1938, so as to obtain a joint which is homogeneous with the rest of the belt. Alternatively the join may be made by chamfering the ends of the belt to a wedge form and lapping the two wedges under heat and pressure. This method is mainly suitable in the case of multi-ply belting, as the constituent plies can be cut in stepped formation at each end of the strip. Where desired, however, the ends of the belt can be joined with standard fasteners.

As an alternative to stretching the fabric and maintaining it stretched until the rubber has dried, we may however impregnate the fabric with rubber after knitting and allow the rubber to dry on the fabric without stretching, the fabric being afterwards warmed sufficiently to render the rubber plastic. This softening of the rubber enables the fabric to be stretched to the required extent, and if it is so stretched while the rubber is warm and maintained stretched until the rubber has cooled, the rubber will set again and prevent subsequent contraction of the fabric. This method is of course applicable only when uncured rubber is used for the impregnation, and the fabric preferably should be given a final curing treatment on the press. Although the rubber may become plastic again when heated in the press, the pressure applied to the fabric prevents it from contracting and there is no need to stretch the fabric while under the press.

One example of the manufacture of belting in accordance with the invention will be described with reference to the accompanying drawing, in which:—

Figure 1:
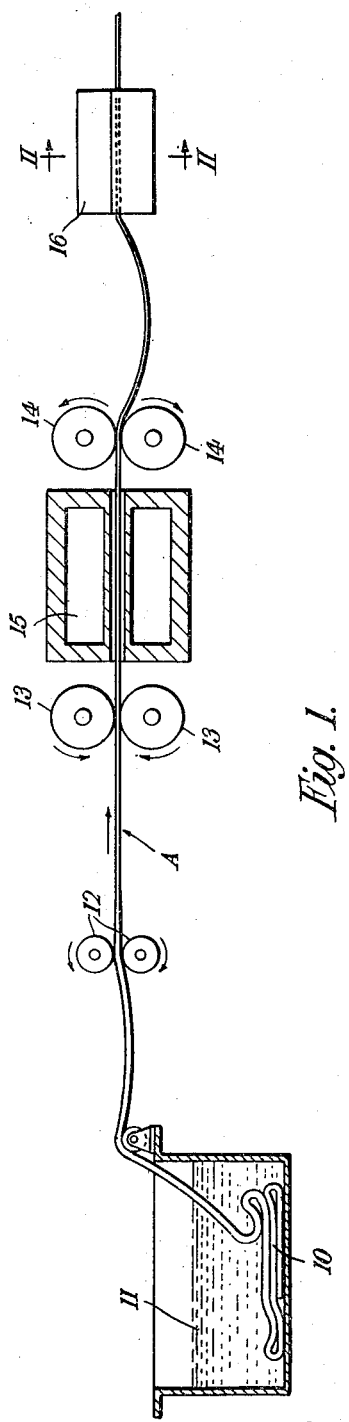
Fig. 1 is a diagram showing successive stages in the process.
Figure 2:
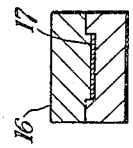
Fig. 2 is a section on the line II—II in Fig. 1.

A strip 10 of knitted fabric, knitted on a knitting machine from cotton free from rubber, and of greater width and thickness than the final belt required, is dropped into a bath 11 of latex or rubber solution. When thoroughly wetted it is withdrawn by a pair of spiked rollers 12. Fig. 1 being purely diagrammatic the spikes on rollers 12 are not shown. The fabric then passes to a second pair of spiked rollers 13 rotating at a higher speed than the rollers 12 thus imparting to the fabric at region A the necessary degree of stretch. The stretched fabric is taken away from rollers 13 by a third pair of spiked rollers 14 which rotate at the same speed as rollers 13. Between rollers 13 and 14 the fabric passes through a drying oven 15. The rubber is thus dried on the fabric while it is maintained stretched.

From rollers 14 the fabric is taken to a heated press 16 having dies which, when closed, define a mould cavity 17 of the section of the finished belt required.

The fabric is cured in the press bit by bit, the press remaining closed for the required vulcanising period, which may be from 5 to 20 minutes according to the temperature and rubber composition which have been selected.

The cured fabric is then cut to length as required, and joined to form a belt. While the fabric has been shown passing directly from the rollers 14 to the press 16, it will be understood that it may be necessary in practice to use a discontinuous process, laying the fabric aside after rubberising, stretching and drying, and applying the curing treatment subsequently.

Figure 3:
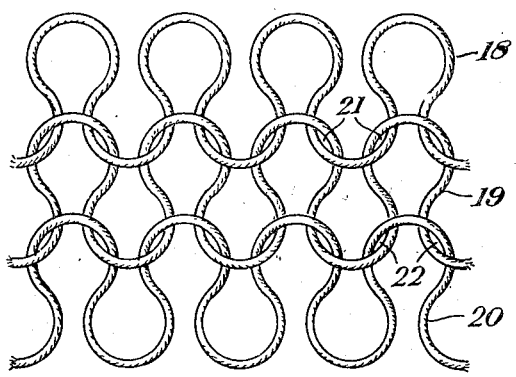
Fig. 3 is an enlarged diagrammatic representation of a portion of the fabric showing the loops constituting the knitted fabric before stretching and treatment with the rubber.
Figure 4:
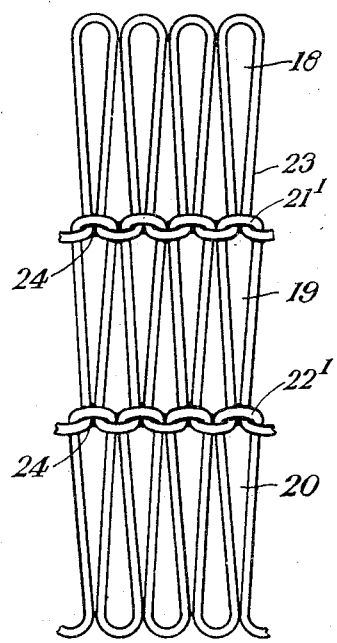
Fig. 4 is a similar view of the fabric after impregnation, stretching and subsequent drying.

The operation of the process and the formation of the resulting product will be indicated further by reference to Figures 3 and 4. In the original knitted state the loops of the fabric, such as 18, 19, 20, assume the forms of naturally easy curves as shown in Fig. 3, these loops intersecting as is indicated at 21, 22. When the fabric is stretched in the lengthwise direction of the strip, which is also the lengthwise direction of the belt, the stitches straighten to form the elongated loops shown in Fig. 4, with the crossing stitches at the intersections of the loops drawn into tight knots, as is indicated at $21^1$, $22^1$. The outer surfaces of the stitches are coated with rubber, as is indicated at 23, after the drying is completed, the relatively small amount of rubber within the knots, indicated at 24, coating the adjacent surfaces of crossing stitches and extending continuously therebetween to bond these surfaces together, to prevent the untieing of the knots. The interiors of the loops will, to a considerable extent, be free of rubber, after the drying is completed, but if the belt is subsequently cured under heat and pressure these voids will naturally become much smaller, in accordance with the pressure used.

While the invention has been described with reference to its application to fabric knitted from yarn free from rubber, it may nevertheless also be applied to fabric knitted from rubberised yarn while in a wet or lubricated condition, the knitted fabric being thereafter impregnated with wet rubber, stretched and held stretched until the rubber has dried. We prefer to knit the fabric from rubberized yarn because of the improved friction properties of the belts made therefrom in comparison with belts knitted from unrubberized textile yarn, in which the only rubber present is that applied for the purpose of holding the belt against contraction from its stretched length, it being noted that the rubber of the rubberized yarn, which is in effect an integral portion of the yarn itself, plays no part in preventing the fabric from stretching or contracting. It will also be observed that when a belt made from the fabric knitted of rubberized yarn is subsequently cured under heat and pressure the voids within the loops of the knitted fabric will become smaller than is the case when a belt made from the unrubberized knitted fabric is cured under equal pressure, because of the fact that there is much more rubber in the article in the first case, to flow under heat and pressure and therefore to some extent to fill the voids. The fabric can be knitted from any desired textile yarn, e. g. cotton or flax.

What we claim as our invention and desire to secure by Letters Patent is:

1. A friction surface belt comprising a strip of knitted fabric formed of elongated interconnected loops stretched in the lengthwise direction of the strip and tied together into tight knots at their intersections, substantially all of the surfaces of the stitches comprising the same being coated with rubber, with the adjacent surfaces of crossing stitches within the knots being bonded together by rubber, the said belt having substantially no tendency to contract and having an extension at break of about 3 to 17 per cent.

2. A friction surface belt comprising a strip of knitted fabric formed of elongated interconnected loops stretched in the lengthwise direction of the strip and tied together into tight knots at their intersections, substantially all of the surfaces of the stitches comprising the same being coated with rubber, with the adjacent of crossing stitches within the knots being bonded together by rubber, the said belt having substantially no tendency to contract and having an extension at break of about 3 to 17 per cent, the belt having a friction surface of rubber on both faces thereof, all of the rubber in the belt being in a cured condition.

3. A friction surface belt comprising a strip of fabric knitted from rubberized textile yarn, formed of elongated interconnected loops stretched in the lengthwise direction of the strip and tied together into tight knots at their inersections, substantially all of the surfaces of the stitches comprising the same being coated with rubber, with the adjacent surfaces of crossing stitches within the knots being bonded together by rubber, the said belt having substantially no tendency to contract and having an extension at break of about 3 to 17 per cent.

GEORGE ANGUS SOWERBY.
WILLIAM STANLEY SHORT.

REFERENCES CITED

The following references are of record in the file of this patent:

UNITED STATES PATENTS

| Number | Name | Date |
|---|---|---|
| 1,697,236 | Gingas | Jan. 1, 1929 |
| 1,929,839 | Dawson | Oct. 10, 1933 |
| 2,004,110 | Head | June 11, 1935 |
| 2,005,407 | Abrahamsen et al. | June 18, 1935 |
| 2,106,119 | Krasselt | Jan. 18, 1938 |